DAVID C. HAUPT
WALTER F. SMITH
INVENTORS

DAVID C. HAUPT
WALTER F. SMITH
INVENTORS

United States Patent Office 3,719,077
Patented Mar. 6, 1973

3,719,077
APPARATUS FOR TESTING INFRARED SENSITIVE FUZES
David C. Haupt, Riverside, and Walter F. Smith, Alta Loma, Calif., assignors to the United States of America as represented by the Secretary of the Navy
Filed Dec. 6, 1960, Ser. No. 75,071
Int. Cl. G01l 5/14
U.S. Cl. 73—167                                          6 Claims The invention herein described may be manufactured and used by or for the Government of the United States of America for governmental purposes without the payment of any royalties thereon or therefor.

The present invention relates to fuze testing apparatus and more particularly to centrifuge apparatus for testing electromagnetic radiation responsive fuzes. With the apparatus of the present invention the production quality of fuzes can be monitored and the apparatus can also be used in the development and surveillance of infrared sensitive fuzes.

Previously, infrared sensitive fuzes were sample tested by using sample round of fuzes in test vehicles similar to the missiles in which such type of fuzes were to be used. The test vehicles were then fired from a ground launching ramp and delivered, airborne, within a defined burst radius of the fuze from three pairs of lamp type targets generating infrared energy and spaced at intervals downrange from the launching ramp. This old method had disadvantages. Since the flight path of the test vehicle was unpredictable, the radiation received by the fuze could not be accurately controlled, and the determination of the radiation received by the fuze could only be approximated by calculating the miss distance based on photographic records, having limited accuracy, of the test vehicle trajectory. Further the time required for processing, reducing and analyzing photographic records is undesirable in production, and wind effects and other adverse weather conditions can cause additional delays in testing. Also this type of testing is very expensive since it requires a special test vehicle for each round along with necessary cameras, film, range personnel data reduction and range maintenance; and in addition, the fuzes are not always recoverable for examination.

The present method for testing two channel infrared sensitive fuzes is relatively simple and much less expensive than heretofore known means. According to the present invention, an infrared sensitive fuze is mounted on a centrifuge machine, subjected to an acceleration force sufficient to cause it to arm, its power supply activated, and momentarily subjected to infrared radiation in a number of gradually increasing steps from two collimated infrared beams, and at some increment of infrared radiation the fuze normally will fire.

It is an object of the invention, therefore, to provide a relatively simple and inexpensive means for testing infrared sensitive fuzes.

It is also an object of the invention to provide apparatus for testing fuzes having two-channels of infrared detection and requiring infrared radiation to be received first by one detection channel and then the other in order to fire.

It is another object of the invention to provide a new means for testing infrared sensitive fuzes.

It is a further object of the invention to provide a means for testing production infrared fuzes safely and quickly under laboratory conditions.

Other objects and many of the attendant advantages of this invention will become readily appreciated as the same becomes better understood by reference to the following detailed description when considered in connection with the accompanying drawings wherein.

Figure 1:
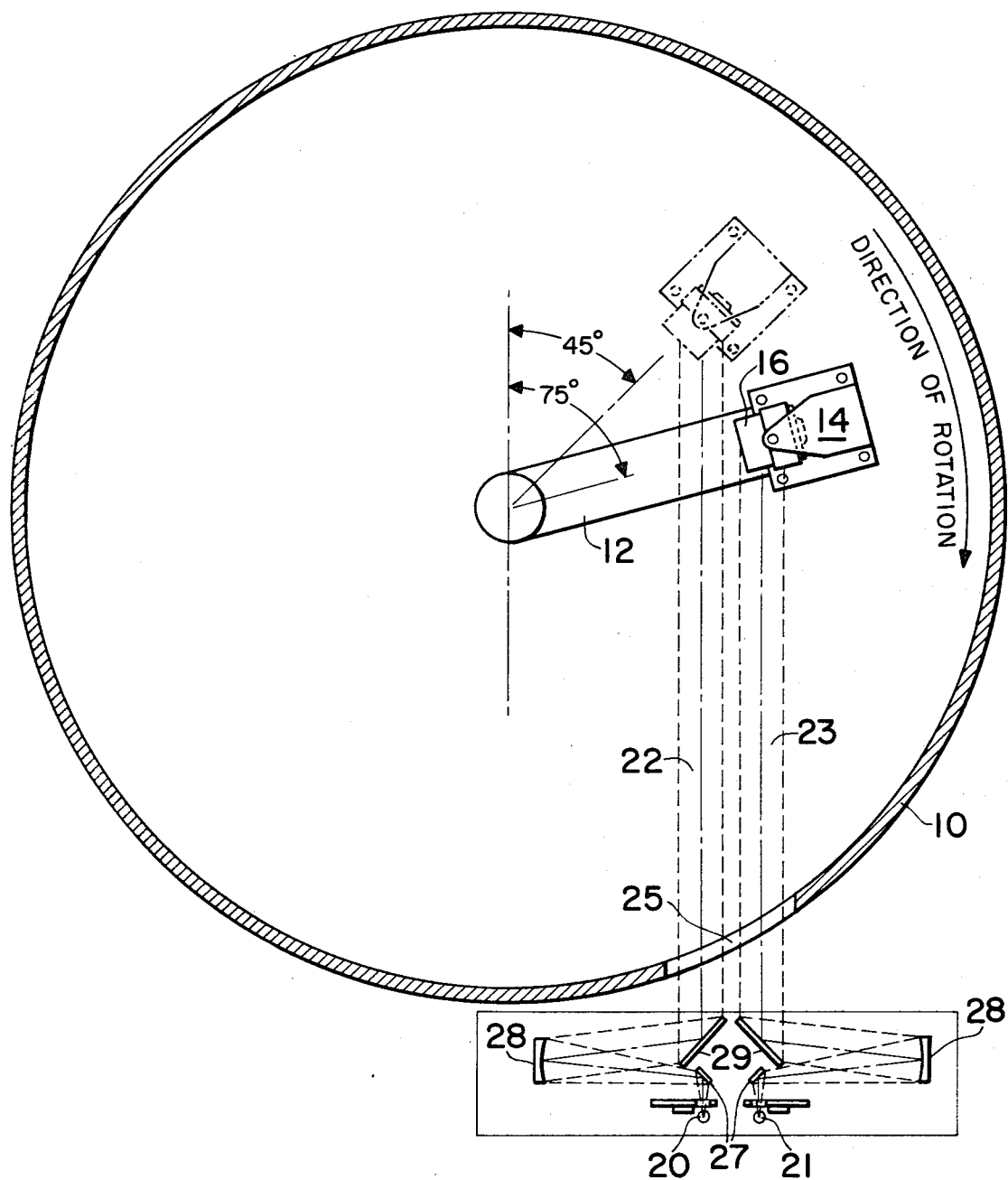
FIG. 1 is diagrammatic layout of the centrifuge machine and the infrared light sources used therewith.

The present apparatus is for testing influence fuzes of the infrared type consisting of two optical detecting channels electronic amplifier unit, a mechanical safety and arming mechanism, a self-contained and electrically-initiated thermal battery, and a primer for detonation. In order for the fuze to fire, infrared radiation of certain selected bandwidths must be received first one channel (Channel I) and then by the other channel (Channel II).

A fuze of the foregoinng type when undergoing test is mounted on a centrifuge machine of the apparatus described hence, is suddenly subjected to an acceleration sufficient to cause it to arm, is electrically initiated by applying a voltage which in turn activates a battery, and is momentarily subjected to infrared radiation in a number of gradually increasing steps. The steps of infrared radiation are maintained within specified values of intensity and bandwidth as required for fuze operation. Then at some increment of infrared radiation the fuze will fire.

Referring now to the drawings, like numerals refer to like parts in each of the figures.

The apparatus, as illustrated in the schematic of FIG. 1, comprises a centrifuge housing 10 having a rotatable arm 12 carrying a fuze mounting bracket 14. An infrared fuze 16, to be tested, is securely attached to bracket 14 for rotation with centrifuge arm 12. Infrared radiation is provided by infrared sources 20 and 21 which project radiation in filtered and collimated beams, 22 and 23 respectively, from outside the centrifuge machine through window 25 in the side of the centrifuge housing 10. Infrared radiation beams 22 and 23 are positioned and directed from Channel I source 20 and Channel II source 21 through window 25 into the centrifuge machine by means of a plurality of optical mirrors 27, 28 and 29 for each of the infrared sources. Infrared beams 22 and 23 are so placed that beam 22 will be received by the Channel I detector in a fuze 16 at a specified angular position for this channel (for example as shown, at 45 degrees from the center-line of the fuze) and either at the same time or a short time later beam 23 will be received by the Channel II detector in the fuze at a specified angular position for this channel (such as 75 degrees from the centerline of the fuze, as shown for example).

A fuze 16 to be tested is mounted on centrifuge arm 12 with its longitudinal axis horizontal and intersecting the spin axis of the centrifuge machine, and with the forward end of the fuze pointing toward this spin axis. Mounting bracket 14 keeps the fuze in this position while being rotated on arm 12 about the spin axis of the centrifuge machine. The fuze is rotated in the centrifuge machine so as to produce a necessary arming acceleration, such as 20 g acceleration for example, on the fuze during testing. A continuous type of recording device may be connected outside the apparatus so as to indicate each revolution of the centrifuge machine on a record and the level of infrared radiation when firing of the fuze occurs. A recording device is shown in schematic diagram of FIG. 2, which is discussed below.

Figure 2:
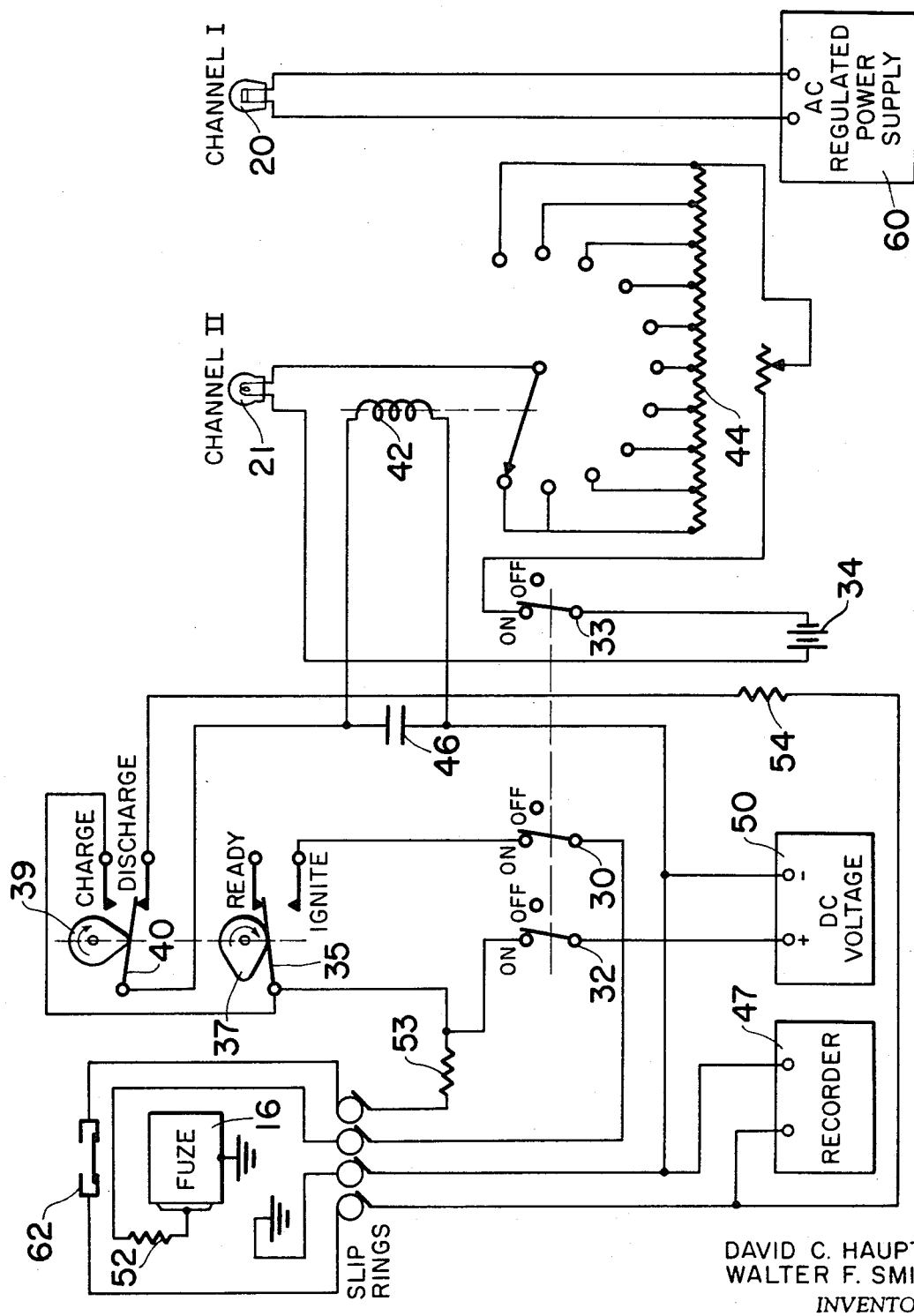
FIG. 2 is a schematic diagram of the circuit and apparatus of the present invention.

A battery electric match and a fuze thermal battery, not shown, are located within fuze 16. Switch 30 and cam operated switch 35 are both in series with fuze 16, as shown in FIG. 2, and with the battery electric match and the fuze thermal battery therein. Both switch 30 must be closed to "on" position and cam operated switch 35 must be closed to "ignite" position before the fuze thermal battery in fuze 16 can be activated to detonate the fuze when the detecting channels receive the proper intensity of infrared radiation. Switch 30 is manually operated and is thrown when the centrifuge is up to speed and the fuze 16, under test, has been accelerated sufficiently to cause it to arm. Switches 32 and 33 are ganged with switch 30 and all three switches are closed manually at the same time.

Cam operated switch 35 is actuated upon each rotation of the centrifuge arm 12 by cam 37, when the cam is in a predetermined angular position; the position of cam 37 is adjustable on the axis of rotation of the centrifuge arm so that the thermal battery in fuze 16 can be actuated when switch 35 is closed to "ignite" position at a time when arm 12 carrying the fuze is in proper relationship with infrared beams 22 and 23.

Each rotation of centrifuge arm 12 also rotates cam 39 and actuates cam-operated microswitch 40. The closing of switch 40 to "charge" position admits voltage to coil 42 of a stepping relay which in turn provides ten steps of resistance 44 in series with infrared source 21 of Channel II, a tungsten lamp for example. It should be noted that switch 40 can be used to provide power, at intervals, to a solenoid operated shutter, if desired, or else another cam operated microswitch could be used so that the centrifuge arm position at which opening and closing the shutter occurred could be varied. Also, cam-operated microswitch 40 when closed to "discharge" position operates to close a circuit which permits capacitor 46 to discharge through recorder 47 each revolution of the centrifuge arm and cause a "blip" on the recording. Switch 33, which is thrown along with switch 30 after the centrifuge is up to speed as previously mentioned, prevents any current from battery 34 from activating infrared source 21 until the fuze is armed.

Switch 32, which is also ganged and thrown with switch 30 is for the purpose of preventing activation of the thermal battery (not shown) in fuze 16 before the centrifuge is up to desired speed and the fuze is armed. A D.C. voltage source 50 supplies the current to ignite the battery match, in fuze 16, activating the thermal battery in the fuze when switch 32 is closed to "on" position. Resistors 52, 53, and 54 are used as current limiting resistors, the values of which are chosen to suit the characteristics of the fuze being tested and the equipment used.

Channel I, infrared source 20, is powered by steady A.C. regulated power supply 60, which provides a constant beam 22 of infrared radiation, whereas the Channel II beam 23 of infrared radiation varies in intensity with each diminishing step of relay resistance 44.

The infrared sources 20 and 21 are in effect target simulators and consist of filtered tungsten filament lamps, for example, directed into an optical system designed to project a collimated beam, two inches high and four inches wide for example, of uniformly distributed infrared energy into the centrifuge machine, as previously described in conjunction with FIG. 1. Each of the two infrared outputs are directed by flat mirrors 27 into spherical converging mirrors 28 and reflected as collimated beams by flat mirrors 29 into the centrifuge machine, as two parallel beams 22 and 23 the proper distance apart and in their proper angular relationship to the fuze 16. Filters can be used where desired for the purpose of limiting the bandwidth of the infrared energy entering the centrifuge machine as per fuze requirements.

As stated earlier, a continuous type recording device 47 is used to indicate the infrared level at which firing occurs. This is accomplished by use of cam operated switch 40 and a loose carbon contactor 62. Cam 39 which is mechanically coupled to the centrifuge arm 12, causes switch 40 to close to "discharge" position on each revolution permitting capacitor 46 to discharge and superimpose a spike on the trace of recorder 47 with each revolution, and when fuze 16 fires, the small shock is sufficient to jar contactor 62 and thus cause another interruption in the record in the form of a small spike in the opposite direction from that caused by the capacitor. Firing is also indicated by an audible report. The infrared source voltage of Channel II is monitored on another channel of the recorder, showing each step in voltage as an additional step on the record.

Briefly, the fuze testing apparatus operates as follows: The fuze is mounted in proper position on the centrifuge arm 12, and the centrifuge turned on and brought up to speed sufficiently to cause the fuze to arm. Infrared source 20, Channel I, is on and radiating. Switch 30 is turned "on" permitting ignition of the battery match in fuze 16 when cam-operated switch 35 is switched from "ready" to "ignite" position. Switches 32 and 33 are turned "on" with switch 30 permitting infrared source 21, Channel II, to radiate and relay 42 to operate upon each revolution of the cam of switch 40, and also connect contactor 62 into the circuit of recorder 47. When the fuze is positioned, as illustrated as in FIG. 1, so that it receives infrared radiation from beams 22 and 23 at the proper angles and at suitable intensity, the fuze will fire. Thus each step of infrared intensity will be recorded simultaneously along with each revolution of the centrifuge arm due to discharge of the capacitor and also when the fuze fires, therefore giving an indication of the position of the fuze and the intensity of the infrared source at the time of firing.

Obviously many modifications and variations of the present invention are possible in the light of the above teachings. It is therefore to be understood that within the scope of the appended claims the invention may be practiced otherwise than as specifically described.

What is claimed is:

1. Apparatus for testing influence fuzes of the infrared sensitive type that have optical detecting channels and arming and detonation means for detonating the fuze when the optical detecting channels properly receive infrared radiation of selected bandwidths; said test apparatus comprising centrifuge means for exerting acceleration forces on such a fuze sufficient to cause the fuze arming means to arm, target simulating means for subjecting certain of the fuze detecting channels to a number of gradually increasing steps of infrared radiation within specified values of intensity and bandwidth as required for fuze operation, wherein when the fuze detecting channels detect the proper infrared radiation the fuze can detonate, and means for recording when said fuze detonates in relation to the values of intensity of infrared radiation.

2. Apparatus for testing influence fuzes of the infrared sensitive type that have two optical detecting channels, plus safety and arming means, and an electrically initiated electric power supply and a primer for detonation when the fuze is armed and the power supply is activated and proper infrared radiation impinges successively on the detecting channels; said test apparatus comprising a centrifuge means in which a fuze is mounted in a position suitable for operation of the fuze safety and arming means causing the fuze to arm when said fuze is subjected to a sufficient acceleration force by said centrifuge, target simulating means which direct collimated beams of infrared radiation into said centrifuge means to successively impinge upon the detecting channels of said fuze when the fuze is at specific angular relationships therewith for the detection thereof, means for initiating the power supply of said fuze and means for incrementally changing the intensity of one of said infrared beams with rotation of said centrifuge means, whereby said fuze will detonate at some intensity of infrared radiation, and recording means for indicating the angular position of the fuze in said centrifuge means with respect to the collimated beams of infrared energy along with the intensity of the infrared source at the time said fuze detonates.

3. Apparatus for testing influence fuzes of the infrared sensitive type that have two optical detecting channels, plus safety and arming means, electrically initiated power supply and a primer for detonation when the fuze is armed and the power supply activated and when infrared radiation successively impinges on the two detecting channels; said test apparatus comprising a centrifuge means in which a fuze is mounted for subjecting said fuze to an acceleration force sufficient to cause the fuze to arm, target simulating means for directing collimated beams of infrared energy into said centrifuge means to impinge upon the detecting channels of said fuze when at specific angular relationships therewith, means for activating the power supply of said fuze and means for incrementally changing the intensity of one of said beams of infrared energy with rotation of said centrifuge means, whereby said fuze will detonate at some intensity of infrared radiation, and recording means for indicating the angular position of the fuze in said centrifuge means with respect to the collimated beams of infrared energy along with the intensity of the infrared beams at the time said fuze detonates.

4. Apparatus for testing influence fuzes of the infrared sensitive type that have a plurality of optical detecting channels, plus safety and arming means, and an electric power supply and a primer for detonation when the fuze is armed and the power supply on and infrared radiation of suitable intensity is received successively by each of the plurality of detecting channels; said test apparatus comprising a centrifuge means in which a fuze to be tested is mounted in a suitable position for the fuze safety and arming means to arm the fuze when subjected to sufficient acceleration force by said centrifuge, target simulating means which direct collimated beams of infrared radiation into said centrifuge means to successively impinge upon successive detecting channels of said fuze when the fuze is in various specified angular relationships therewith for the detection thereof, means for initiating the fuze power supply, means for incrementally changing the intensity of one of said beams of infrared radiation with each rotation of said centrifuge means whereby said fuze can detonate at some intensity of infrared radiation, and recording means for indicating the angular position of the fuze in the centrifuge means with respect to the collimated beams of infrared radiation and the intensity of the beams of infrared radiation at the time the fuze detonates.

5. Apparatus for testing influence fuzes of the infrared sensitive type that have optical detecting channels for receiving infrared radiation at selected angles plus arming means and detonation means for detonating the fuze when the detecting channels properly receive infrared radiation of selected bandwidth; said test apparatus comprising centrifuge means for exerting acceleration forces on such a fuze sufficient to cause the fuze arming means to arm, target simulating means for sequentially subjecting certain of the fuze detecting channels to a number of gradually increasing steps of infrared radiation within specified values of intensity and bandwidth as required for fuze operation, wherein when the fuze detecting channels detect the proper infrared radiation in the proper sequence the fuze can detonate, and recording means connected with said apparatus for indicating when said fuze detonates in relation to the values of intensity of infrared radiation and its position within said centrifuge means.

6. Apparatus as in claim 5 wherein said centrifuge means contains means on which the fuze is mounted in a position for suitable test operation of said arming means and for receiving at certain times infrared radiation from said target simulators at proper angles for detection thereof.

References Cited
UNITED STATES PATENTS 2,236,719   4/1941   Riggen _____ 73—167 X SAMUEL FEINBERG, Primary Examiner U.S. Cl. X.R.
102—70.2; 343—17.7